(12) United States Patent
Bush (10) Patent No.: US 7,579,597 B1
(45) Date of Patent: Aug. 25, 2009

(54) SCINTILLATION ARTICLE INCLUDING A PHOTOMULTIPLIER TUBE ARTICLE

(75) Inventor: Michael S. Bush, Ravenna, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 12/134,785

(22) Filed: Jun. 6, 2008

(51) Int. Cl.
*G01T 1/20* (2006.01)
(52) U.S. Cl. .................................. 250/361 R
(58) Field of Classification Search .............. 250/361 R
See application file for complete search history.

(56) References Cited

U.S. PATENT DOCUMENTS

5,006,048 A 4/1991 Jow

*Primary Examiner*—David P Porta
*Assistant Examiner*—Marcus H Taningco
(74) *Attorney, Agent, or Firm*—Larson Newman & Abel, LLP; Thomas G. Field, III (57) ABSTRACT

A scintillation article including a scintillation detector coupled to a photomultiplier tube (PMT) housing, and a PMT assembly disposed within the PMT housing. The scintillation article further includes a cap assembly selectively coupled to the PMT assembly, wherein upon moving the cap assembly from an assembled position in which the cap assembly is engaged with the housing to an extracted position in which the cap assembly is disengaged and removed from the housing, the cap assembly mechanically engages the PMT assembly and extracts the PMT assembly from the PMT housing.

20 Claims, 4 Drawing Sheets

SCINTILLATION ARTICLE INCLUDING A PHOTOMULTIPLIER TUBE ARTICLE

BACKGROUND

1. Field of the Disclosure

The following disclosure is directed to scintillation articles, and more particularly a PMT assembly and cap assembly that are removable from a PMT housing.

2. Description of the Related Art

Radiation detector devices are used in a variety of industrial applications, for example, well logging in the oil and gas industry. Typically, the detectors have scintillator crystals made of an activated sodium iodide or other material that is effective for detecting certain types of radiation. Because the scintillator crystals are sensitive components, they are generally enclosed in casings or sleeves. The casings can include a window to permit radiation-induced scintillation light to pass out of the crystal package to a light-sensing device such as a photomultiplier tube. The photomultiplier tube converts the light photons emitted from the crystal into electrical pulses, which are shaped and digitized by associated electronics and may be registered as counts that are transmitted to analyzing equipment.

In certain applications, such as the well logging industry, scintillation detectors are useful because they are capable of measuring the radiation, such as gamma rays and neutrons emitted from surrounding rock strata. In fact, scintillation detectors can be used in drilling apparatuses themselves, giving rise to the common practice of measurement while drilling (MWD) (or logging while drilling). Nonetheless, MWD applications often take place in severe environments characterized by large amounts of heat, vibration and shock. Vibration and shock can cause the detector and/or the PMT assembly to malfunction or fail.

Accordingly, the industry continues to need improvements in scintillation articles and PMT assemblies, particularly designed to be used in the harsh environments of industrial applications.

SUMMARY

According to a first aspect, a scintillation article includes a scintillation detector coupled to a photomultiplier tube (PMT) housing, and a PMT assembly disposed within the PMT housing. The scintillation article further includes a cap assembly selectively coupled to the PMT assembly, wherein upon moving the cap assembly from an assembled position in which the cap assembly is engaged with the housing to an extracted position in which the cap assembly is disengaged and removed from the housing, the cap assembly mechanically engages the PMT assembly and extracts the PMT assembly from the PMT housing. Generally, in the assembled position, the PMT is optically coupled to the scintillator crystal.

In particular conditions, a portion of the cap assembly is operably coupled to the PMT housing in the assembled position, and more particularly, a retainer can be operably coupled to the cap assembly. The cap assembly can include a shield cap and the retainer disposed within an interior space of the shield cap. The engagement of the shield cap and retainer can be facilitated by a groove extending circumferentially around an outer surface of the retainer, and fasteners can be used to operably coupling the retainer within the shield cap, by engagement of the fasteners within the groove.

Moreover, the retainer is selectively coupleable with the PMT assembly, and in the extracted position, the retainer mechanically engages a portion of the PMT assembly. In certain embodiments, the retainer includes a recess and a portion of the PMT assembly is configured to extend into the recess, such that a portion of the PMT assembly is in a floating position extending into an engagement space defined by a recess within a portion of the cap assembly. Portions of the PMT assembly can include a stud coupled to and extending from a first end of the PMT, wherein the stud can further include a flange that extends into the recess. In particular instances, in the assembled position, the flange is in a floating position within the recess, and when the cap assembly is changed to an extracted position, the flange of the stud mechanically engages a flange of the retainer.

In more particular instances, the engagement space has a height that is greater than a height of the portion of the PMT assembly, for example, not greater than about 5 mm. In particular embodiments, the engagement space has an expansion tolerance gap of at least about 15% of the engagement space height, or within a range between about 20% and about 35% of the engagement space height. For example, the expansion tolerance gap can be at least about 0.75 mm.

In other particular embodiments, a lower surface of the cap assembly is disposed a failsafe distance from an upper surface of the PMT assembly. The failsafe distance is generally greater than the expansion tolerance gap, on the order of at least about 1 mm in certain instances, and in some examples the expansion tolerance gap is at least about 10% less than the failsafe distance, and more particularly, within a range between about 20% and about 40% of the failsafe distance.

According to another embodiment of the first aspect, the engagement space has a contraction tolerance gap of at least about 10% of the engagement space height, and more particularly within a range between about 15% and about 25% of the engagement space height. In certain conditions, the contraction tolerance gap is at least about 0.4 mm.

The scintillation article can further include a shock absorbing pad coupled to a first end of a PMT, and a spacer coupled to the shock absorbing pad, and even a biasing member coupled to the PMT. In the assembled position, the biasing member can bias the PMT toward the second end of the PMT housing and maintain a floating position between a portion of the cap assembly and a portion of the PMT assembly. In particular instances, the biasing member is a ring-shaped wave spring, such that the biasing member substantially surrounds a portion of the cap assembly.

The retainer can be made of a metal, such as titanium, aluminum, iron, nickel, cobalt, and chrome, or alloys thereof. The retainer can be a horseshoe or u-shaped object, having an opening extending axially along a height of the retainer. In certain instances opening has a circular cross-sectional contour having an average diameter of not greater than about 10 mm.

In another aspect, a photomultiplier tube (PMT) article includes a PMT housing, a PMT assembly disposed within the PMT housing, and a cap assembly selectively coupled to the PMT assembly. Upon moving the cap assembly from an assembled position in which the cap assembly is engaged with the housing to an extracted position in which the cap assembly is disengage and removed from the housing, the cap assembly mechanically engages the PMT assembly and extracts the PMT assembly from the PMT housing. In certain examples, a surface of the PMT assembly is in a floating position relative to a surface of the cap assembly when the cap assembly is in the assembled position, while in the extracted position, the surface of the cap assembly is in direct contact with the surface of the PMT assembly.

Like other certain embodiments, the cap assembly can include a retainer coupled to a shield cap, the retainer comprising a recess having surfaces defining an engagement space. And the PMT assembly can include a stud extending from a first end of the PMT, wherein a portion of the stud extends into the engagement space and is in a floating position relative to the surfaces of the recess when the cap assembly is in the assembled position. In such embodiments, a portion of the stud can mechanically engage a portion of the surfaces of the recess when the cap assembly is in the extracted position.

A method of services a photomultiplier article is included which comprises the steps of providing a PMT housing comprising a cap assembly coupled to the PMT housing and a PMT assembly disposed within the PMT housing, decoupling the cap assembly from the PMT housing, and removing the cap assembly from the PMT housing. Upon removing the cap assembly from the PMT housing, the cap assembly mechanically engages the PMT assembly and the PMT assembly is removed from the PMT housing.

In another aspect, a method of assembling a photomultiplier tube (PMT) article includes placing a PMT assembly within a PMT housing, positioning a cap assembly over the PMT assembly, and coupling the cap assembly to the PMT housing. Upon coupling the cap assembly to the PMT housing, a portion of the PMT assembly is in a floating position relative to the cap assembly.

During placing the PMT assembly within the PMT housing, a second end of the PMT can be optically coupled to an optical window. Moreover, the cap assembly can include a retainer and positioning the cap assembly comprises placing the retainer around a portion of the PMT assembly, such that in particular instances it includes placing the retainer around a stud extending from a first end of a PMT. The stud can be positioned within the retainer such that it is in a floating position within an engagement space defined by a recess within the retainer. The engagement space can include an expansion tolerance gap and a contraction tolerance gap, wherein the expansion tolerance gap is greater than the contraction tolerance gap, and the expansion tolerance gap is at least about 15% of the engagement space height. In certain conditions, the contraction tolerance gap is at least about 10% of the engagement space height.

In other particular embodiments, the step of positioning of the cap assembly further includes placing a shield cap over the retainer, and then coupling the retainer to the shield cap, which may be accomplished by extending a set screw through the shield cap and into a groove of the retainer.

Other steps can be added to the assembly procedure to add components to the PMT article, including for example, placing a shock absorbing pad in the PMT housing adjacent to a first end of the PMT assembly prior to positioning the cap assembly, placing a spacer in the PMT housing adjacent to the shock absorbing pad, and placing a biasing member in the PMT housing adjacent to the spacer.

DESCRIPTION OF THE PREFERRED EMBODIMENT(S)

The following discloses a scintillation article, and more particularly a photomultiplier tube (PMT) assembly that can be contained within a PMT housing and optically coupled to a detector having a scintillator crystal. The PMT article includes a PMT assembly and cap assembly that are configured to selectively couple upon movement of the cap assembly to a certain position.

Figure 1:
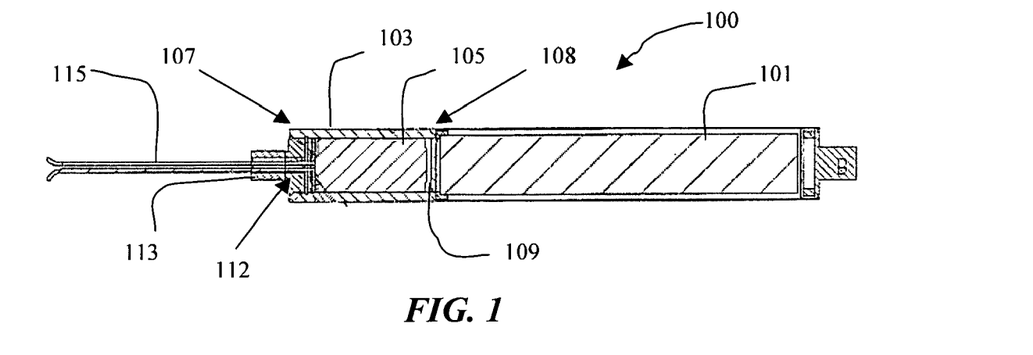
FIG. 1 includes a cross-sectional illustration of a scintillation article in accordance with an embodiment.

FIG. 1 includes a cross-sectional illustration of a scintillation article in accordance with an embodiment. In particular, the scintillation article 100 includes a detector 101 which may be suitable for detecting particular types of radiation by virtue of a scintillator crystal contained therein. Suitable scintillator crystals can include activated halide-containing materials, such as rare-earth halide materials and alkali halide materials. According to one embodiment, the scintillator crystal can be an activated halide crystal, for example, activated $LaBr_3$, $LaCl_3$, $GdI_3$, $GdBr_3$, and $LuI_3$. Still, in other embodiments, the scintillator crystal can be an activated iodide crystal, such as a thallium-activated sodium iodide crystal.

The scintillation article 100 can further include a PMT housing 103 for incorporation of a PMT assembly 105 therein. The PMT housing 103 includes a first end 107 that houses a cap assembly 112 for sealing the PMT housing and a second end 108 that is coupled to the detector 101. The PMT housing can be a casing having a shape suitable for securing a PMT 105 therein, having for example, a cylindrical shape or rectangular shape for example.

The PMT housing can be made of a metal material, such as a refractory metal or metal alloy suitable for use in industrial environments. For example, suitable metals can include titanium, cobalt, chrome, molybdenum, aluminum, steel, nickel, or any combination thereof.

The PMT housing includes a PMT 105 disposed therein. The PMT includes electronics suitable for converting the light signals emitted from the scintillator crystal into electrical pulses that may be registered as counts for analysis. Such electronics may include, among other things, a photocathode, an electron detector, an amplifier, a pre-amplifier, a discriminator, an analog-to-digital signal converter, or the like. Additionally, the PMT 105 can be a hybrid PMT. As further illustrated, proximate to the end 108 within the PMT housing 103, an optical coupling pad 109 can be provided for suitable optical coupling between the PMT 105 and the detector 101. In one embodiment, the optical coupling pad 109 is a UV-transparent silicone gel pad.

The PMT housing 103 can be sealed via a cap assembly 112 coupled to the first end 107 of the PMT housing. The cap assembly 112 can include multiple parts, one of which is the shield cap 113. As illustrated in FIG. 1, the cap assembly 112 can further include an opening, extending axially and facilitating the passage of wires 115 therethrough. The wires 115 are electrically coupled to the electronics within the PMT and are used to transmit signals to analyzing equipment.

Figure 2:
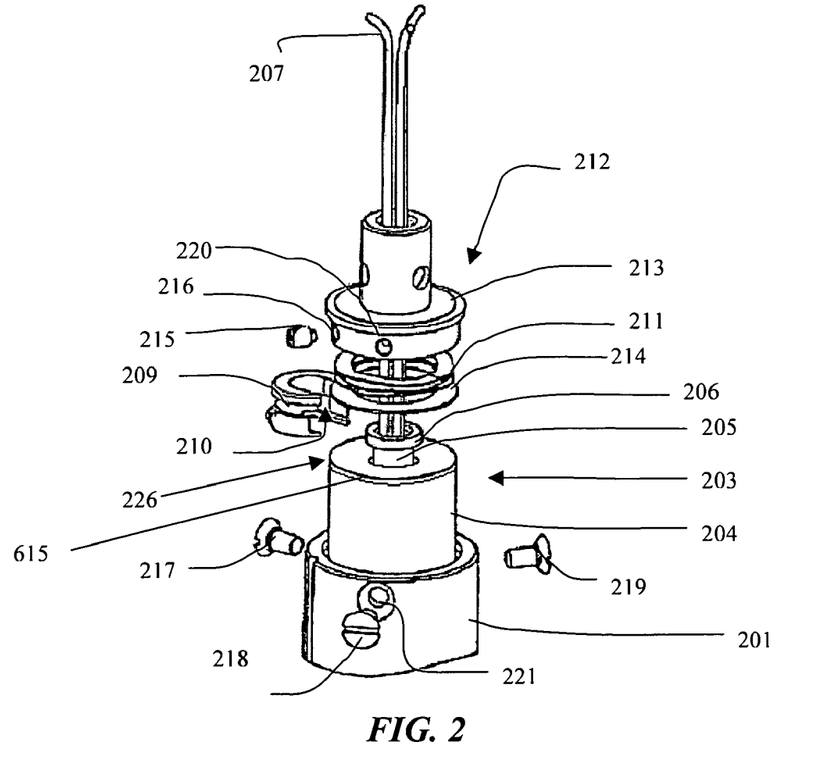
FIG. 2 includes an exploded view of a scintillation article including components of the photomultiplier tube assembly and cap assembly in accordance with an embodiment.

FIG. 2 includes an illustration of a scintillation article including particular components such as the PMT assembly and cap assembly in accordance with one embodiment. The scintillation article includes a PMT housing 201 and a PMT assembly 203 configured to be disposed within the PMT housing 201. The PMT assembly 203 includes a PMT 204 shaped to fit within the PMT housing 201 and seated within the PMT housing 201 such that it is recessed within the PMT housing 201. In accordance with the illustrated embodiment, the PMT assembly 203 further includes a stud 205 coupled to and extending from an end of the PMT 204, wherein the stud has a flange 206 extending from an upper end.

The scintillation article illustrated can further include an optional shock absorbing pad 615 coupled to an end 226 of the PMT 204. The shock absorbing pad 615 can be positioned at the end 226 of the PMT 204 to mitigate shocks and reduce damage to the sensitive electronic components within the PMT 204. The shock absorbing pad 615 can include a soft material such as a polymer, and more particularly an elastomer or gel material.

As further illustrated in FIG. 2, the scintillation article includes a cap assembly 212 configured to seal the PMT assembly 203 within the PMT housing 201. The cap assembly 212 can include components, such as the shield cap 213, which is a component for closing the PMT assembly 203 within the PMT housing 201. In one embodiment, the shield cap 213 can be coupled to the housing via screws 217, 218, and 219 that extend through openings in the PMT housing 201, for example opening 221, and into a corresponding and aligned openings within the shield cap 213, for example opening 220.

The shield cap 213 can generally include a refractory material, and as such, typically includes a metal or ceramic material. In accordance with one embodiment, the shield cap 213 is made of a refractory metal or refractory metal alloy, including for example, titanium, aluminum, chrome, molybdenum, steel, nickel, cobalt, or any combination thereof. Moreover, as further illustrated in FIG. 2, the shield cap 213 can include an opening extending axially through the interior of the shield cap 213 to facilitate extension of the wires 207 from the PMT 204 and through the shield cap 213.

The cap assembly 212 can further include a retainer 209. The retainer 209 can be coupled to an interior space within the shield cap 213 and selectively coupled to the end 226 of the PMT assembly 203. The retainer 209 generally has a u-shape contour including an opening extending axially along a height of the retainer 209 to facilitate coupling of the retainer 209 to the PMT assembly 203.

Generally, the retainer 209 is made of a material suitable for operation in industrial environments and can be made of a material such as a ceramic, metal, or polymer. In accordance with an embodiment, the retainer 209 is made of a refractory metal or metal alloy, for example, titanium, cobalt, chrome, molybdenum, aluminum, steel, nickel, or combinations (i.e., alloys) thereof. Other aspects of the retainer 209 will be described in more detail herein.

The scintillator article of FIG. 2 further includes a spacer 214 that can be coupled to the end 226 of the PMT assembly 203. For such embodiments using a shock absorbing pad 615 abutting the end 226 of the PMT assembly 203, the spacer 214 can directly contact or abut the shock absorbing pad 615. The spacer 214 can have an annular shape and be configured to substantially surround a portion of the retainer 209 when the retainer 209 is coupled to the PMT assembly 203. In fact, the retainer can be disposed within the inner opening of the spacer 214.

In accordance with one embodiment, the inner opening of the spacer 214 has a diameter generally within a range between about 8 mm and about 25 mm, and more particularly within a range between about 10 mm and about 15 mm. In one particular embodiment, the spacer 214 has a first opening having a first diameter as described above. The first opening extends a portion of the way through, for example through half of the thickness of the spacer 214, and provides a recess for engagement and positioning of the retainer 209 therein. In such embodiments, the spacer 214 can have a second opening, connected to the first opening and extending through the remainder of the thickness of the spacer 214 and having a smaller diameter than the first diameter and configured to couple to the PMT assembly 203. For example, in accordance with an embodiment, the second opening can have a diameter that is at least about 50%, such as at least about 75%, or even at least about 90% of the first diameter. Certain embodiments use a second opening having a second diameter that is not greater than about 95% of the first diameter.

A biasing member 211 can be coupled to the PMT assembly 203 such that in the assembled position, the biasing member 211 biases the PMT 204 toward a distal end of the PMT housing 201 for suitable optical coupling with a detector. Additionally, the biasing member 211 further facilitates maintaining a floating position between a portion of a cap assembly 212 and a portion of the PMT assembly 203, when the article is in its assembled-for-use form. The biasing member 211 can be incorporated within the scintillation article such that it directly connects to the spacer 214 and further couples to the upper end 226 of the PMT assembly 203 and an inner surface of the shield cap 213. As such, the biasing member 211 can include an object suitable for biasing the PMT assembly 203 from the cap assembly, such as a spring. In one particular embodiment, the biasing member 211 is a wave spring having an annular shape. In a more particular embodiment, the retainer 209 and the biasing member 211 are fitted such that the retainer 209 sits in an inner annular opening and is substantially surrounded by the biasing member 211.

The biasing member 211 can be made of a material such as a metal or polymer. In accordance with a particular embodiment, the biasing member 211 is made of a refractory metal or metal alloy, including for example, stainless steel, titanium, nickel, cobalt, chrome, aluminum or any combination thereof.

Figure 3:
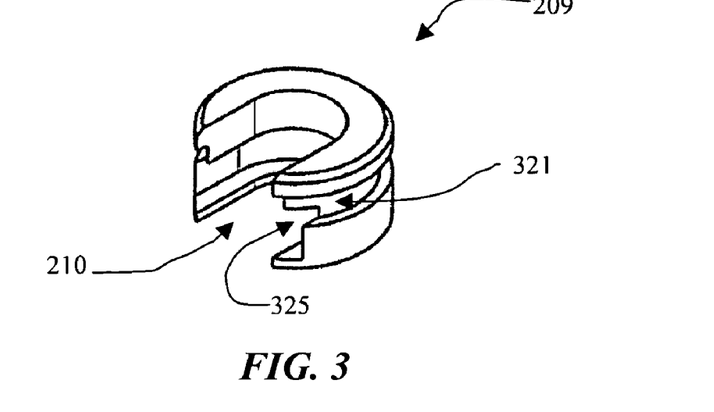
FIG. 3 includes a perspective illustration of a retainer in accordance with an embodiment.
Figure 4:
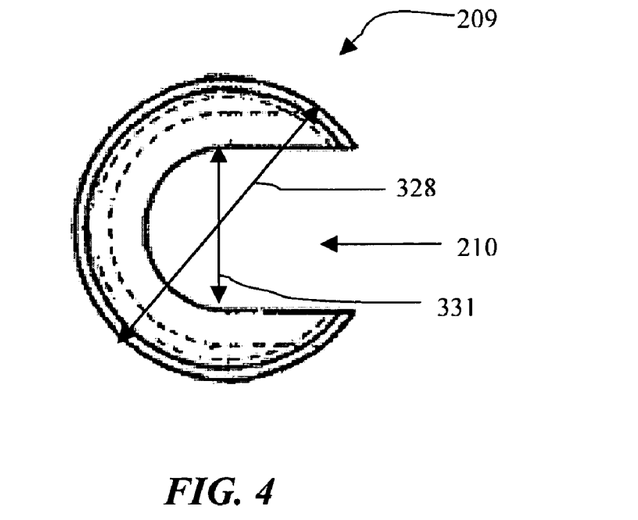
FIG. 4 includes a top view illustration of a retainer in accordance with an embodiment.
Figure 5:
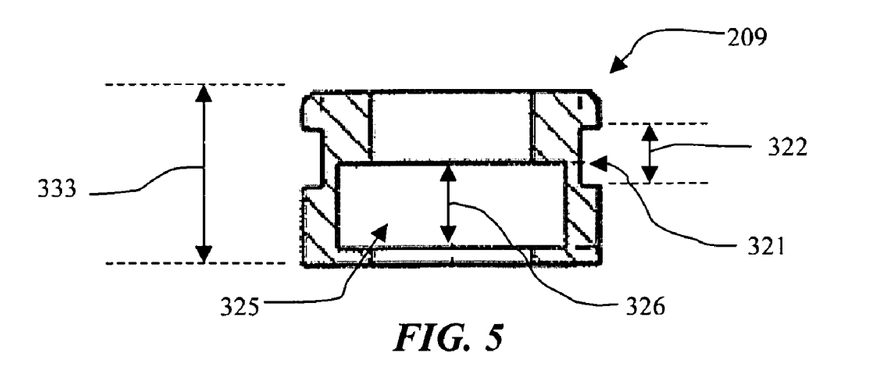
FIG. 5 includes a cross-sectional illustration of a portion of a retainer in accordance with an embodiment.

FIGS. 3-5 illustrate certain embodiments of a retainer including description of dimensional aspects that facilitate its incorporation with the PMT assembly and cap assembly. Notably, the dimensional aspects of the following illustrated embodiments are particularly suitable for performance and functioning of the scintillation article in industrial environments. FIG. 3 includes a perspective view of a retainer in accordance with an embodiment. As illustrated, the retainer 209 has a generally cylindrical shape having an opening 210 that extends axially along a height of the retainer 209 and gives the retainer 209 a generally U-shaped cross-sectional contour. The opening 210 can facilitate coupling of the retainer 209 to a portion of the PMT assembly during assembly and quick removal when servicing the PMT article.

The retainer 209 further includes a groove 321 that extends circumferentially around an outer surface of the retainer 209. The groove 321 facilitates coupling of the retainer 209 with the other components of the cap assembly, and provides a surface upon which fasteners can be engaged. As illustrated in one embodiment, the groove extends for then entire circumference of the outer surface. However, in other embodiments, the retainer 209 can include more than one groove along the surface, each groove being discrete and spaced apart circumferentially from other grooves and spanning a fraction of the outer circumference of the retainer 209. In such instances, each discrete groove is configured to receive and engage a different fastener.

The retainer 209 further includes a recess 325 extending circumferentially along an inner surface. In accordance with one embodiment, the recess 325 defines an engagement space that can house a portion of the PMT assembly as will be described in more detail herein.

FIG. 4 includes a top view illustration of the retainer in accordance with one embodiment. FIG. 4 more clearly illustrates the opening 210 and an arcuate portion of the opening 210 defining an average inner diameter 331 suitable for selective engagement with the stud 205 of the PMT assembly 203. Generally, the average inner diameter 331 is not greater than about 10 mm. In accordance with other embodiments, the average inner diameter 331 can be less, such as not greater than about 9 mm, or even not greater than about 8 mm. Generally, the average inner diameter 331 is within a range between about 5 mm and about 8 mm.

The retainer 209 also has an outer surface that can have a substantially arcuate shape defining an average outer diameter 328. In accordance with an embodiment, the average outer diameter of the retainer 209 is not greater than about 18 mm. In other embodiments, it may be less, such as not greater than about 17 mm, 15 mm, or even not greater than about 13 mm. The average outer diameter 328 can be limited to a range between about 10 mm and 15 mm.

FIG. 5 illustrates a cross-sectional view of a portion of the retainer in accordance with an embodiment. The retainer 209 has an average height 333 measured between the lower outer surface and the upper outer surface suitable for incorporation within a cap assembly and selective coupling with a portion of a PMT assembly. In accordance with an embodiment, the retainer 209 generally has an average height 333 not greater than about 12 mm. In other embodiments, the average height is within a range between about 5 mm and about 10 mm and more particularly, within a range between about 6 mm and 9 mm.

FIG. 5 further illustrates a cross-sectional view of a portion of the recess 325 that is displaced along an interior inner surface of the retainer 209 as also illustrated in FIG. 3, as will be more fully illustrated in other embodiments herein, the recess 325 has particular dimensions defining an engagement space within the retainer 209 that facilitates selective engagement with a portion of the PMT assembly. As such, in one particular embodiment, the recess 325 has a average height 326 that is at least about 1 mm, such as at least about 2 mm, or even at least about 2 mm. In accordance with a particular embodiment, the recess 325 has a height 326 within a range between about 1 mm and about 6 mm.

As further illustrated in FIG. 5, the groove 321 extends around an outer periphery of the retainer 209. As described herein, the groove 321 provides a recess along the outer surface of the retainer 209 for engagement with a fastener such that the retainer 209 can be coupled to the cap assembly. In accordance with a particular embodiment, the groove 321 is designed such that it has an average height 322 not greater than about 5 mm, not greater than about 4 mm, not greater than about 3 mm, and particularly within a range between about 2 mm and about 3 mm.

The groove 321 has a depth for engaging a portion of a fastener therein and coupling the retainer 209 to the cap assembly. In one embodiment, the groove 321 has a depth within a range between about 1 mm and about 3 mm, and more particularly within a range between 1 mm and about 2 mm.

Figure 6:
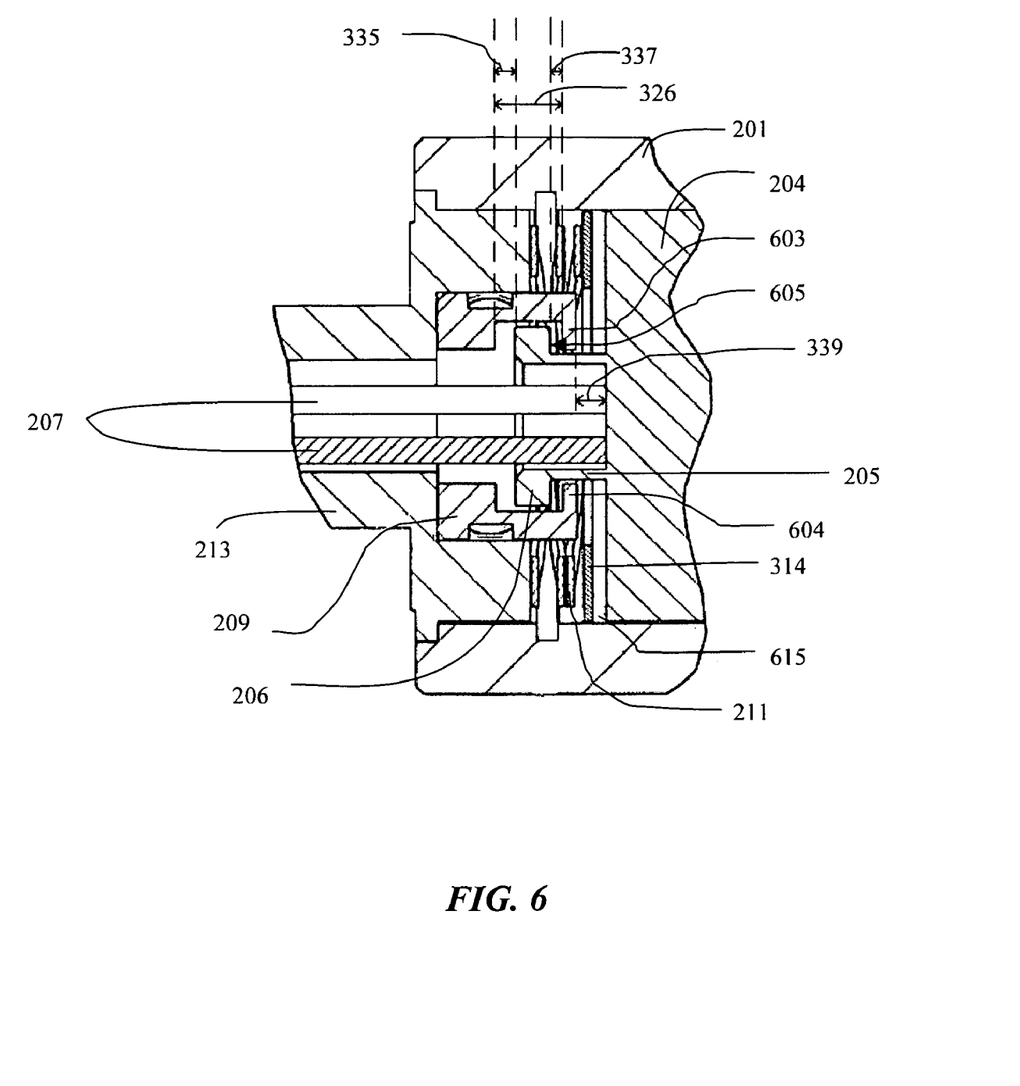
FIG. 6 a cross-sectional illustration of a portion of a PMT assembly and a cap assembly in the assembled position in accordance with an embodiment.

FIG. 6 includes a cross-sectional illustration of a portion of the PMT assembly and the cap assembly in an assembled position in accordance with an embodiment. In particular, FIG. 6 provides an illustration of the components previously illustrated in FIG. 2 in an assembled position wherein the cap assembly 212 is operably coupled to the PMT housing 201. As such, FIG. 6 illustrates a portion of the PMT 204, including the stud 205 coupled to and extending from an end of the PMT 204, and a flange 206 extending from the stud 205. In the assembled position, the shock absorbing pad 615 is directly contacting and coupled to the end of the PMT 204 and substantially surrounding a portion of the stud 205. The spacer 214 is directly contacting the shock absorbing pad 615 and coupled to the PMT 204, and the biasing member 211 is directly contacting the spacer 214 and coupled to the PMT 204. The spacer 214 and the biasing member 211 are also substantially surrounding a portion of the stud 205. Wires 207 are connected to electronics contained within the PMT 204 and extend from the PMT 204 and through the components previously described.

As further illustrated in FIG. 6, the retainer 209 is placed within an interior space of the shield cap 213 and is coupled to the shield cap 213. In accordance with a particular embodiment, the retainer 209 and the shield cap 213 can form a cap assembly configured to selectively couple to the PMT assembly 203.

The PMT assembly 203 including the PMT 204, stud 205, and flange 206 is illustrated as being in a floating position within the recess 325 of the retainer 209. The "floating position" is defined by the positioning of the surfaces of the flange 206 relative to the recess 325 of the retainer 209, wherein the flange 206 extends into the engagement space defined by the recess 325 but does not directly contact or engage the surfaces of the retainer 209. Maintaining the floating position facilitates selective coupling of the cap assembly 212 and PMT assembly 203 during a change in position of the cap assembly 212 from an assembled position in which the cap assembly 212 is engaged with the PMT housing 201 to an extracted position in which the cap assembly 212 is disengaged and removed from the PMT housing 201. As such, in the assembled position, the PMT assembly 203 and cap assembly 212 are in a floating position relative to each other by virtue of the positioning of the flange 206 and recess 325, but in an extracted position, wherein the cap assembly 212 is disengaged and removed from the PMT housing 201, flanges 603 and 604 of the retainer 209 directly contact and mechanically engage the surface 605 of the flange 206. Notably, when the cap assembly 212 is disengaged and removed from the PMT housing 201, the cap assembly 212 is removed along a longitudinal axis of the PMT housing 201. This change connects the PMT assembly 203 and cap assembly 212 and facilitates the extraction of the PMT assembly 203 from the housing while removing the cap assembly 212 from the PMT housing 201. Moreover, the floating position facilitates operation of the PMT assembly 203 in industrial environments, allowing the PMT assembly 203 to more readily absorb shocks and undergo expansion and contraction.

In accordance with one embodiment, the recess 325 of the retainer 209 is formed such that it has an engagement space height 326 designed to house the stud 205 and provide an expansion tolerance gap 335. The expansion tolerance gap 335 is defined between an upper surface of the recess 325 and an upper surface of the stud 205. The expansion tolerance gap 335 allows for proper operation of the PMT assembly while allowing for thermally-induced and mechanically-induced changes. In particular, the expansion tolerance gap is engineered such that the PMT assembly is operable over a range of temperatures from about −20° C. to at least about 200° C., such that the PMT assembly can expand or contract without damaging the PMT assembly. In accordance with one embodiment, the expansion tolerance gap 335 is at least about 15%, at least about 20%, or even at least about 25% of the engagement space height 326. In a more particular embodiment, the expansion tolerance gap 335 within a range between about 20% and about 35% of the engagement space height 326. In reference to absolute dimensions, in one embodiment, the expansion tolerance gap 335 has a measurement of at least about 0.05 mm and more particularly within a range between about 1 mm and 1.25 mm.

Additionally, in the assembled position, the recess 325 includes a contraction tolerance gap 337 to allow for thermally-induced and mechanically-induced changes without damage to the PMT assembly 203 and its sensitive electronic components. The contraction tolerance gap 337 is defined between a rear surface 605 of the stud 205 and upper surfaces of the flanges 603 and 604 of the retainer 209. The contraction tolerance gap 337 can be less than the expansion tolerance gap 335. In one particular embodiment, the contraction tolerance gap 337 is at least 10% less, at least 20% less, 25% less, and in some cases even at least about 35% less than the expansion tolerance gap 335. The contraction tolerance gap 337 can be limited such that it is less than the expansion tolerance gap by at least about 20%, but not more than about 60% less.

In accordance with a particular embodiment, the contraction tolerance gap 337 is at least about 10% of the engagement space height 326. For example, the contraction tolerance gap 337 can be at least about 15%, 20%, or at least about 25% of the engagement space height 326, and more particularly within a range between about 15% and about 25% of the engagement space height 326. The contraction tolerance gap 337 can have actual dimensions of at least about 0.4 mm, such as at least about 0.5 mm, and particularly within a range between about 0.6 mm and 1.0 mm.

In addition to maintaining a floating position between the cap assembly 212 and PMT assembly 203, the cap assembly 212 and PMT assembly 203 are particularly designed such that the retainer 209 is maintained at a failsafe distance 339 from a top portion of the PMT 204. The failsafe distance 339 is defined as the distance between the upper surface of the PMT 204 and the lowest surface of the retainer 209. In accordance with a particular embodiment, the failsafe distance 339 is greater than the expansion tolerance gap 335, allowing maximum expansion of the PMT assembly while avoiding harm to the PMT assembly 203. Stated alternatively, in extreme temperatures the PMT assembly can expand a distance allowed by the expansion tolerance gap 335 without the flanges 603 and 604 of the retainer 209 coming in contact with the upper portion of the PMT 204 thus avoiding potential damage to the PMT 204 and its sensitive components.

In accordance with a certain embodiment, the expansion tolerance gap 335 is at least about 10% less than the failsafe distance 339. In other embodiments, the difference may be greater, such that the expansion tolerance gap 335 is within a range between about 20% and about 40% of the failsafe distance 339. In terms of dimensions for example, the failsafe distance can be at least about 1 mm, such as at least about 1.25 mm or even at least about 1.5 mm. Still, the failsafe distance 339 can be limited, such as not greater than about 2 mm.

Figure 7:
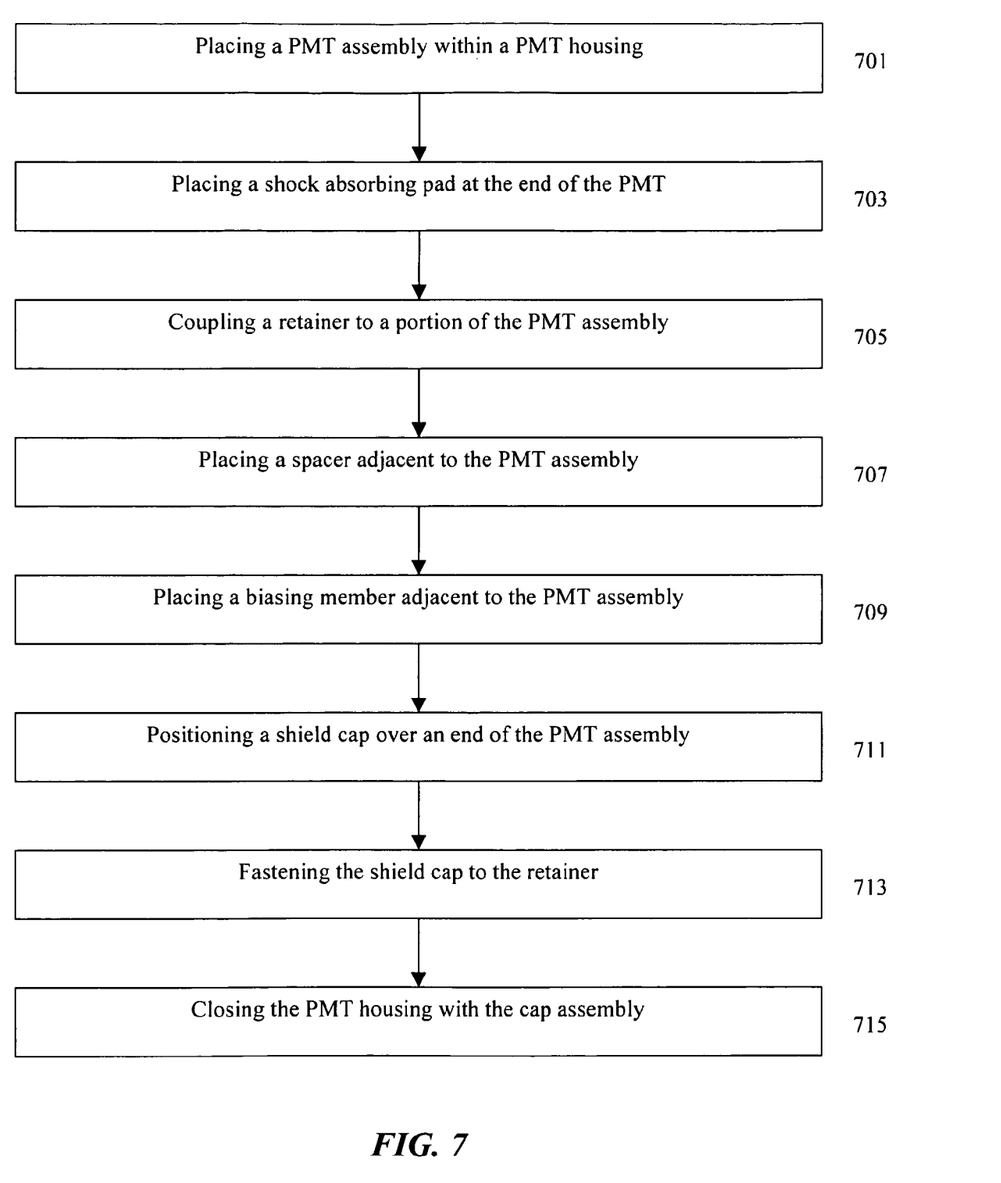
FIG. 7 includes a flow chart illustrating steps for assembling a photomultiplier tube assembly in accordance with an embodiment.

Referring to FIG. 7, a flow chart is provided illustrating a method of assembling a PMT article in accordance with one embodiment. As illustrated, the process is initiated by placing a PMT assembly 203 within a PMT housing 201 at step 701. It will be appreciated that prior to placing the PMT assembly 203 within the PMT housing 201, an optical coupling pad 109 can be placed within the housing at the end configured to attach to the detector 101 to facilitate optical coupling between the PMT assembly 203 and the detector 101. Given the sensitive components within the PMT 204, care is taken to avoid damage to the components and prior to placing the PMT 204 in the housing 201, a shock absorbing member may be placed around the PMT 204 making it suitable for use in industrial applications. The PMT assembly 203, is positioned within the PMT housing 201 for good optical coupling with a detector.

After placing the PMT assembly 203 within the PMT housing 201, the process of can continue at step 703 by placement of an optional shock absorbing pad 615 at the end of the PMT assembly 203 configured to engage and be selectively coupleable with the cap assembly 212.

After placement of the optional shock absorbing pad 615 at step 703, the process can continue at step 705 by coupling a retainer 209 to a portion of the PMT assembly 203. Positioning of the retainer 209 is dependent upon the design of the PMT assembly 203, however referring briefly to FIG. 2, in such embodiments utilizing a stud 205 at the end of the PMT assembly 203, a retainer 209 having an opening and a generally u-shaped cross-sectional contour can be slid on to the stud 205 such that the flange 206 of the stud 205 extends into a recess 325 within the retainer 209. In other embodiments, the features may be reversed, for example, the PMT assembly may include the recess and the retainer may have an extension or flange that extends into the recess and couples the two components during assembly. Notably, during the assembly procedure, the retainer 209 can be mechanically engaged with the PMT assembly 203, until the PMT article is fully assembled, at which time, the retainer 209 and PMT assembly 203 are in a floating position with respect to each other.

After coupling the retainer 209 to a portion of the PMT assembly 203, the process can continue at step 707 by placing a spacer 214 adjacent to one end of the PMT assembly 203. In particular embodiments, the spacer 214 is coupled to the PMT assembly 203, and may be placed in direct contact with the shock absorbing pad 615, as described in accordance with FIG. 2. As illustrated in the particular embodiment of FIG. 2, the spacer 203 has an annular shape such that it can substantially surround the retainer 209 and slide over the stud 205 of the PMT assembly 203.

The assembly process can further continue at step 709, by placing a biasing 211 member adjacent to the end of the PMT assembly 203. According to the illustrated embodiment of FIG. 2, the placement of the biasing member 211 may include placing an annular-shaped wave spring around the retainer 209 and stud 205, such that the wave spring is coupled to the PMT assembly 203 and in direct contact with the spacer 214. Moreover, as will be appreciated, the wires 207 connected to the electrical components of the PMT 203 can extend through the components described above, such as illustrated in FIG. 2.

After properly positioning the biasing member 211, assembly can continue at step 711 by positioning a shield cap 213 over the components assembled at the end of the PMT 203. According to one embodiment, positioning of the shield cap 213 can include sliding the wires 207 extending from the PMT 204 through an opening in the shield cap 213. Additionally, positioning of the shield cap 213 can further include engaging the retainer 209 within an interior space of the shield cap 213.

After positioning of the shield cap 213, the assembly procedure can continue by fixing the shield cap 213 to the retainer 209 at step 713. In accordance with one embodiment, fixing can be accomplished using clasps or fasteners. In accordance with a particular embodiment, one or more set screws are driven through openings in the shield cap 213 until they are engaged within a groove 321 of the retainer 209.

After coupling of the retainer 209 and shield cap 213, the assembly process can be finished by closing the PMT housing 201 with the cap assembly 212. Closing can include placing the PMT assembly 203 within the PMT housing 201 and coupling the shield cap 213 to the PMT housing 201. Coupling can be accomplished using clasps or fasteners, for example in one embodiment, one or more set screws extend through the PMT housing 201 and engage the shield cap 213. In accordance with a particular embodiment, during the closing process, the cap assembly 212 and PMT assembly 203 are set in a floating position with respect to each other, such that the surfaces of the retainer 209 and PMT assembly 203 are not in direct contact with each other. However, as described herein, the PMT assembly 203 and cap assembly 212 are biased from each other such that selective coupling can occur during extraction of the cap assembly 212 from the PMT housing 201.

After assembling the PMT article in such a manner as provided in FIG. 7, extraction of the PMT 204 can be accomplished with ease. Generally, servicing includes decoupling the cap assembly 212 from the PMT housing 201 (e.g., unscrewing the set screws) and extracting the cap assembly 212 the PMT housing 201. Upon moving the cap assembly 212 to an extracted position, the PMT assembly 203 mechanically engages cap assembly 212 and can be extracted from the housing 201. More particularly, the retainer 209 within the shield cap 213 is moved into direct contact with the flange 206 of the stud 205, which allows the user to directly connect the cap assembly 212 with the PMT assembly 203 and extract the PMT 204 from the housing 201.

The components and methods disclosed herein represent a departure from the state-of-the-art. Generally, conventional scintillation articles include a PMT having wires extending from the end of the PMT housing through a unitary shield cap. In the past, servicing of PMTs was not generally conducted, but if servicing was needed, extraction of the PMT from the housing included removing the shield cap and pulling the wires connected to the delicate electronics within the PMT to extract the PMT from the housing. As can be appreciated, such a process may result in damage to the PMT and its components.

By contrast, the PMT article disclosed herein includes a unique design including a combination of components allowing for operation of the article in industrial environments while further providing a serviceable design that reduces potential damage to sensitive PMT components. Notably, the PMT articles included herein include a multi-component cap assembly, including a retainer having particular dimensions and configured to selectively couple with the PMT assembly. Moreover, the components described herein also facilitate operations in industrial environments, providing shock absorption capabilities and improved integrity in environments having varying temperatures.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A scintillation article comprising:
a scintillation detector having;
a photomultiplier tube (PMT) housing coupled to the scintillation detector, the PMT housing having a PMT assembly disposed within the PMT housing; and
a cap assembly selectively coupled to the PMT assembly, wherein upon moving the cap assembly from an assembled position in which the cap assembly is engaged with the housing, to an extracted position in which the cap assembly is disengaged and removed from the housing, the cap assembly mechanically engages the PMT assembly and extracts the PMT assembly from the PMT housing.

2. The scintillation article of claim 1, wherein the cap assembly comprises a retainer operably coupled to the cap assembly.

3. The scintillation article of claim 2, wherein the cap assembly comprises a shield cap and the retainer is disposed within an interior space of the shield cap.

4. The scintillation article of claim 2, wherein the retainer comprises a recess and a portion of the PMT assembly is configured to extend into the recess.

5. The scintillation article of claim 4, wherein the PMT assembly comprises a stud coupled to and extending from a first end of a PMT.

6. The scintillation article of claim 4, wherein the stud comprises a flange and the flange extends into the recess.

7. The scintillation article of claim 1, wherein in the assembled position, a portion of the PMT assembly is in a floating position extending into an engagement space defined by a recess within a portion of the cap assembly.

8. The scintillation article of claim 7, wherein the engagement space comprises a height that is greater than a height of the portion of the PMT assembly.

9. The scintillation article of claim 8, wherein the engagement space comprises an expansion tolerance gap of at least about 15% of the engagement space height.

10. The scintillation article of claim 9, wherein a lower surface of the cap assembly is disposed a failsafe distance from an upper surface of the PMT assembly.

11. The scintillation article of claim 10, wherein the failsafe distance is greater than the expansion tolerance gap.

12. The scintillation article of claim 8, wherein the engagement space comprises a contraction tolerance gap of at least about 10% of the engagement space height.

13. A photomultiplier tube (PMT) article comprising:
a PMT housing;
a PMT assembly disposed within the PMT housing; and
a cap assembly selectively coupled to the PMT assembly, wherein upon moving the cap assembly from an assembled position in which the cap assembly is engaged with the housing to an extracted position in which the cap assembly is disengaged and removed from the housing, the cap assembly mechanically engages the PMT assembly and extracts the PMT assembly from the PMT housing.

14. The PMT article of claim 13, wherein a surface of the PMT assembly is in a floating position relative to a surface of the cap assembly when the cap assembly is in the assembled position.

15. The PMT article of claim 14, wherein the surface of the cap assembly is in direct contact with the surface of the PMT assembly when the cap assembly is in the extracted position.

16. A method of servicing a photomultiplier (PMT) article comprising:
   providing a PMT housing comprising a cap assembly coupled to the PMT housing and a PMT assembly disposed within the PMT housing;
   decoupling the cap assembly from the PMT housing; and
   removing the cap assembly from the PMT housing, wherein during removing the cap assembly along a longitudinal axis of the PMT housing, the cap assembly mechanically engages the PMT assembly and the PMT assembly is removed from the PMT housing.

17. The method of claim 16, wherein the cap assembly comprises a shield cap and decoupling the cap assembly comprises unscrewing the shield cap from the PMT housing.

18. The method of claim 17, wherein the cap assembly further comprises a retainer coupled to the shield cap, wherein during removing the cap assembly from the PMT housing a portion of the retainer is mechanically engaged with a portion of the PMT assembly.

19. The method of claim 18, wherein during removing the cap the retainer mechanically engages a stud extending from a first end of a PMT.

20. The method of claim 19, wherein in an assembled position prior to removing the cap, the stud extends into a recess defining an engagement space within the retainer and is in a floating position within the engagement space.

* * * * *

UNITED STATES PATENT AND TRADEMARK OFFICE
CERTIFICATE OF CORRECTION

PATENT NO. : 7,579,597 B1  Page 1 of 1
APPLICATION NO. : 12/134785
DATED : August 25, 2009
INVENTOR(S) : Michael L. Bush It is certified that error appears in the above-identified patent and that said Letters Patent is hereby corrected as shown below:

On the title page item (75), please correct the inventor's name to correctly read --Michael L. Bush--.

Signed and Sealed this

Twenty-seventh Day of April, 2010

David J. Kappos
*Director of the United States Patent and Trademark Office*